(12) United States Patent
Fukunishi

(10) Patent No.: US 7,936,465 B2
(45) Date of Patent: May 3, 2011

(54) PRINT DATA PROCESSING APPARATUS, PRINTING APPARATUS, PRINTING SYSTEM, PRINT DATA PROCESSING METHOD, AND COMPUTER PROGRAM PRODUCT

(75) Inventor: Shigeki Fukunishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1025 days.

(21) Appl. No.: 11/633,477

(22) Filed: Dec. 5, 2006

(65) Prior Publication Data

US 2007/0133057 A1 Jun. 14, 2007

(30) Foreign Application Priority Data

Dec. 6, 2005 (JP) .................. 2005-352769

(51) Int. Cl.
*G06F 3/12* (2006.01)
*G06K 15/00* (2006.01)
*H04N 1/60* (2006.01)
*G03G 15/00* (2006.01)

(52) U.S. Cl. ................ 358/1.13; 358/1.12; 358/1.15; 358/1.9; 399/82

(58) Field of Classification Search .......... 358/1.1–1.18; 399/82

See application file for complete search history.

(56) References Cited

U.S. PATENT DOCUMENTS

| 6,580,521 | B1 * | 6/2003 | Nishikawa et al. | 358/1.18 |
|---|---|---|---|---|
| 6,922,260 | B2 * | 7/2005 | Nishikawa et al. | 358/1.18 |
| 7,177,564 | B2 * | 2/2007 | Nakamura et al. | 399/82 |
| 7,203,900 | B2 * | 4/2007 | Nara et al. | 715/255 |
| 7,424,237 | B2 * | 9/2008 | Ushio et al. | 399/82 |
| 7,648,217 | B2 * | 1/2010 | Cleary et al. | 347/16 |
| 2002/0051205 | A1 * | 5/2002 | Teranishi et al. | 358/1.18 |
| 2003/0197882 | A1 * | 10/2003 | Tsukuba et al. | 358/1.12 |
| 2006/0126120 | A1 * | 6/2006 | Imafuku et al. | 358/1.18 |

FOREIGN PATENT DOCUMENTS

| JP | 08-328169 | 12/1996 |
|---|---|---|
| JP | 2001-188443 | 7/2001 |
| JP | 2003-089251 A | 3/2003 |
| JP | 2003-233475 A | 8/2003 |
| JP | 2005-078289 A | 3/2005 |

\* cited by examiner

*Primary Examiner* — James A Thompson
*Assistant Examiner* — Satwant K Singh
(74) *Attorney, Agent, or Firm* — Dickstein Shapiro LLP

(57) ABSTRACT

A print data processing apparatus performs combined printing of a plurality of pages including a page on which an image is oriented in a different direction from images on other pages. In the print data processing apparatus, the layout unit lays out, in a memory, print data of target pages in a number specified to be combined into a single print to create print data of a physical page and sends the print data to a printing apparatus to print the print data. The rotation-angle determining unit determines a rotation angle of an image on the target pages based on the specified number of the target pages, the paper feeding direction, the direction of an image on the first page of the target pages, the order in which the target pages are arranged, and the direction of an image on the target pages.

2 Claims, 18 Drawing Sheets

SEF

LEF

L to R

R to L

T to B

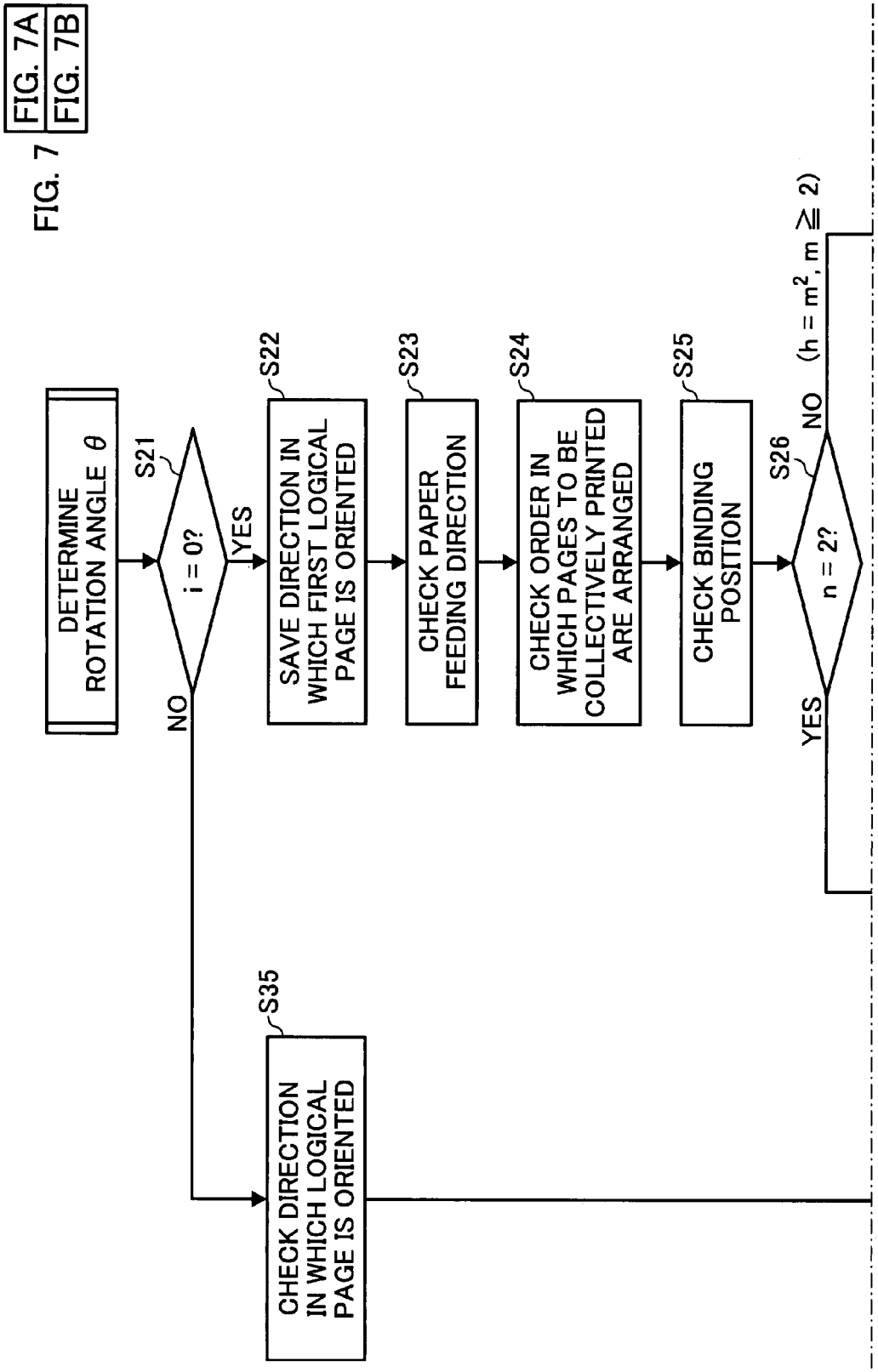

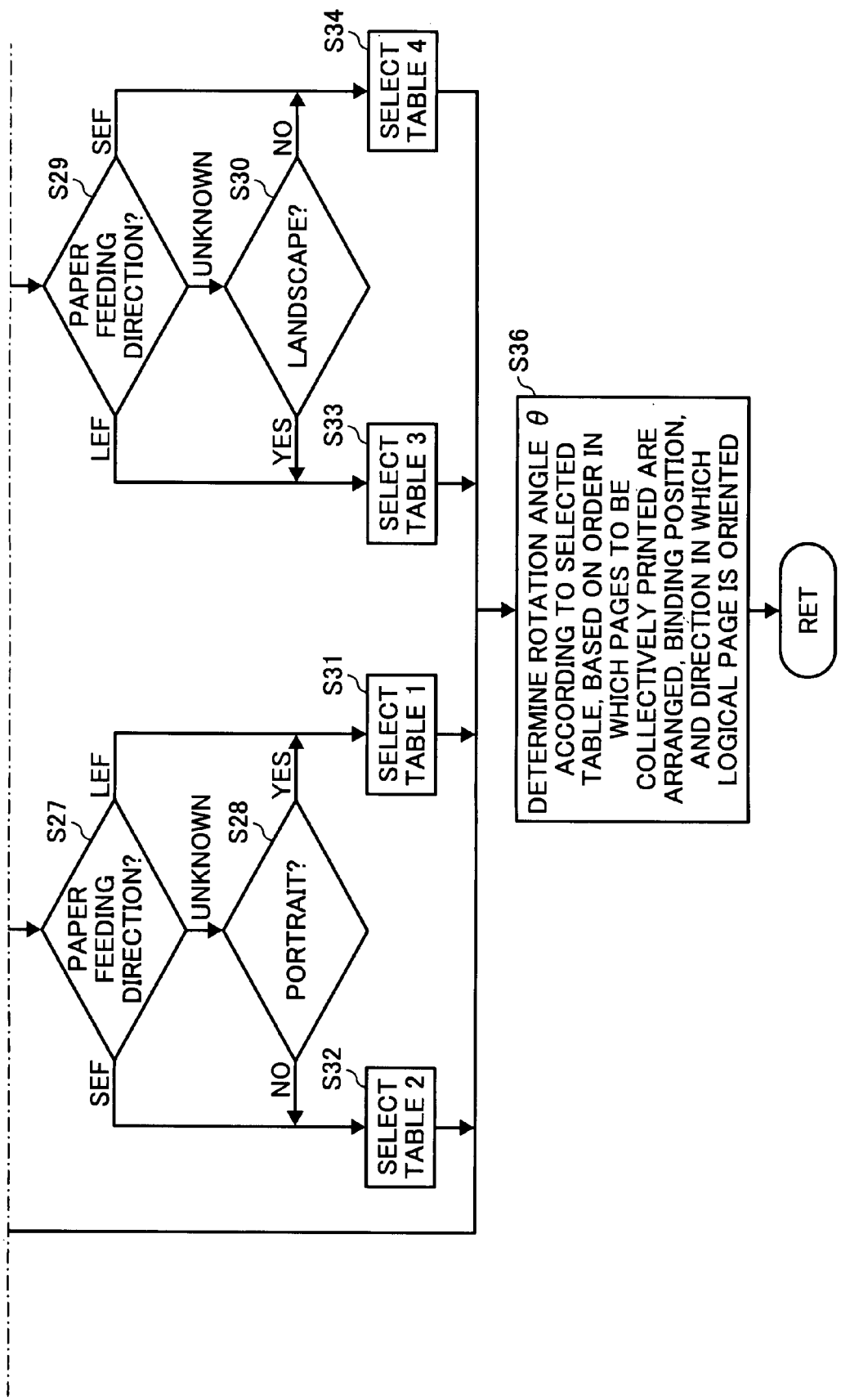

LOGICAL PAGES

TWO-IN-ONE PRINTING

PHYSICAL PAGES

FIG. 12A
LOGICAL PAGES
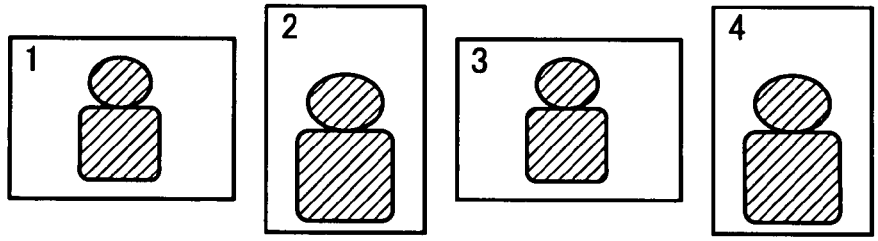
FIG. 12B
PHYSICAL PAGES        TWO-IN-ONE PRINTING
BINDING POSITION ON LEFT
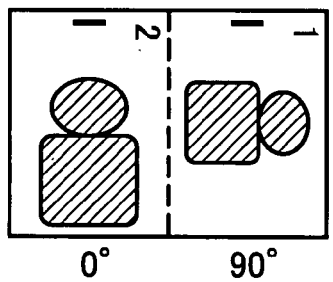 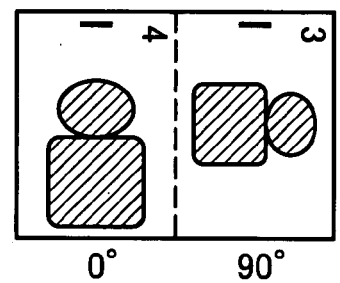
BINDING POSITION ON RIGHT
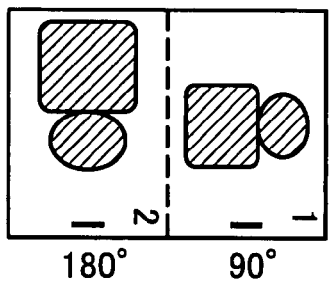 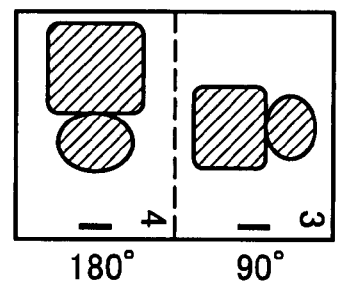
BINDING POSITION ON TOP
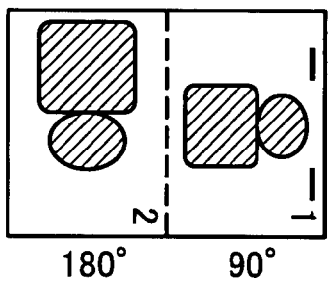 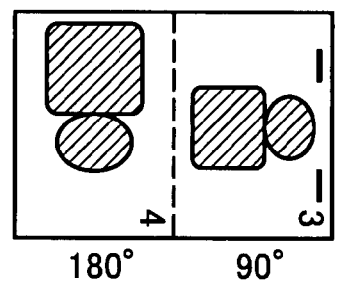

FIG. 13A
LOGICAL PAGES
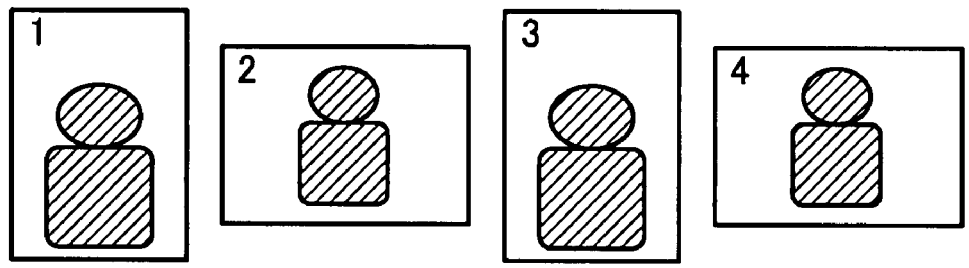
TWO-IN-ONE PRINTING
FIG. 13B
PHYSICAL PAGES
BINDING POSITION ON LEFT
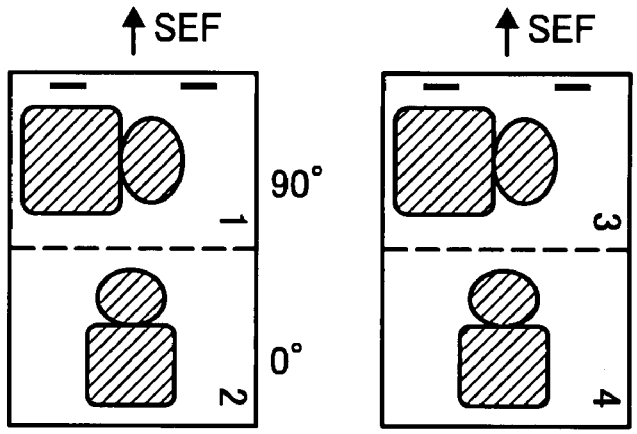
BINDING POSITION ON RIGHT
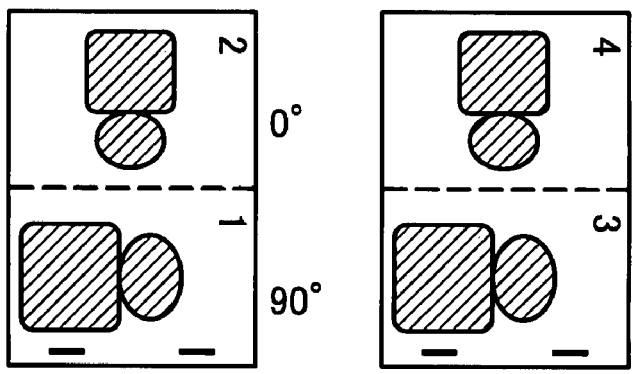

FIG. 14A
LOGICAL PAGES
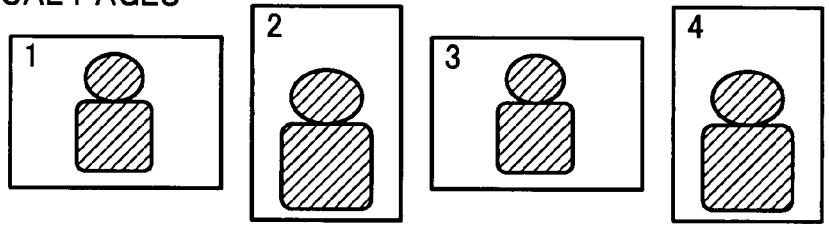
↓ TWO-IN-ONE PRINTING
FIG. 14B
PHYSICAL PAGES
BINDING POSITION ON LEFT
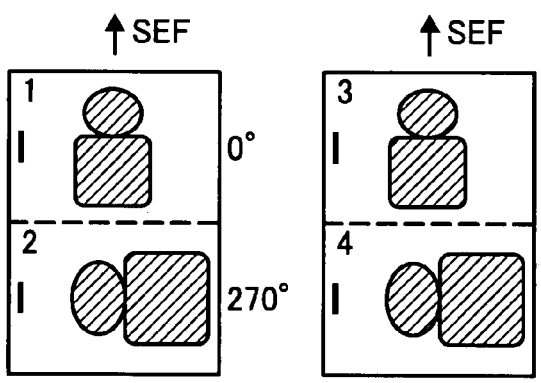
BINDING POSITION ON RIGHT
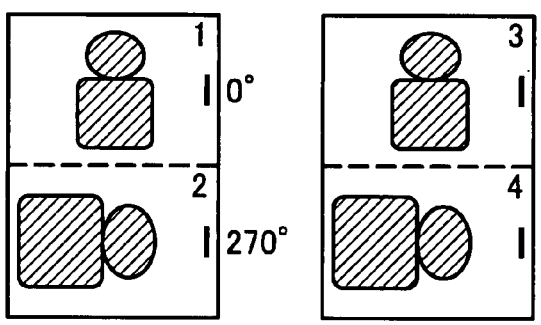
BINDING POSITION ON TOP
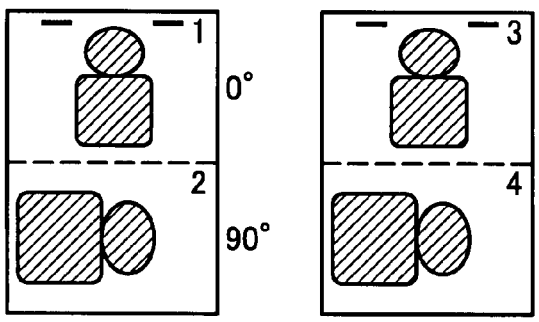

FIG. 15A
LOGICAL PAGES
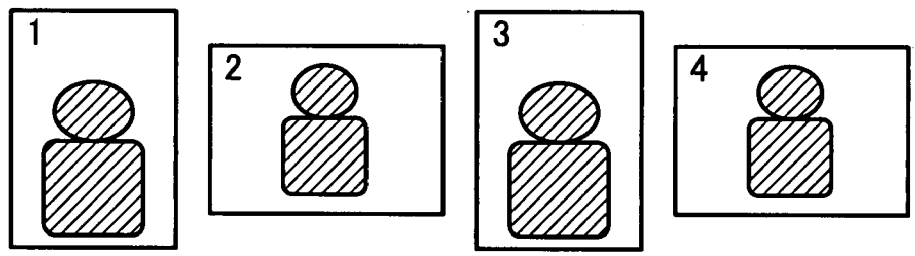
↓ FOUR-IN-ONE PRINTING
FIG. 15B
PHYSICAL PAGES
BINDING POSITION ON LEFT
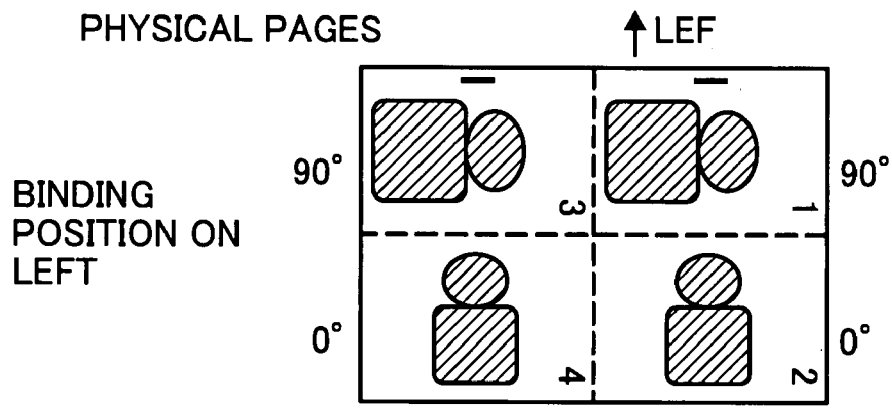
BINDING POSITION ON RIGHT
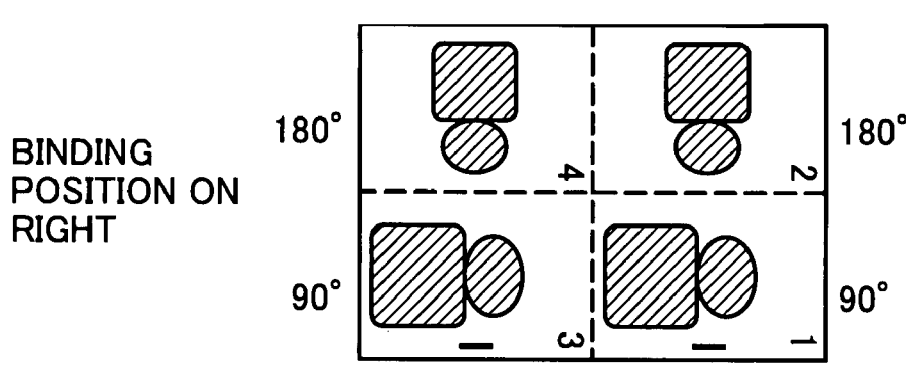

FIG. 16A
LOGICAL PAGES
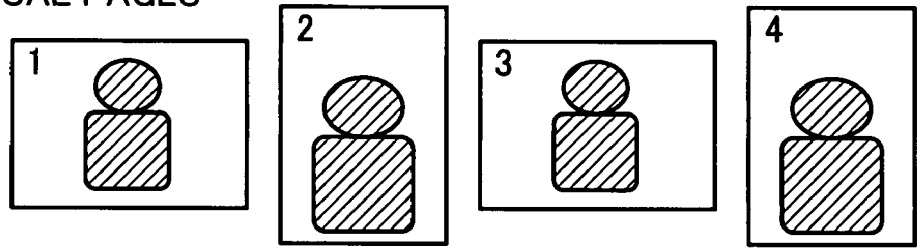
↓ FOUR-IN-ONE PRINTING
FIG. 16B
PHYSICAL PAGES
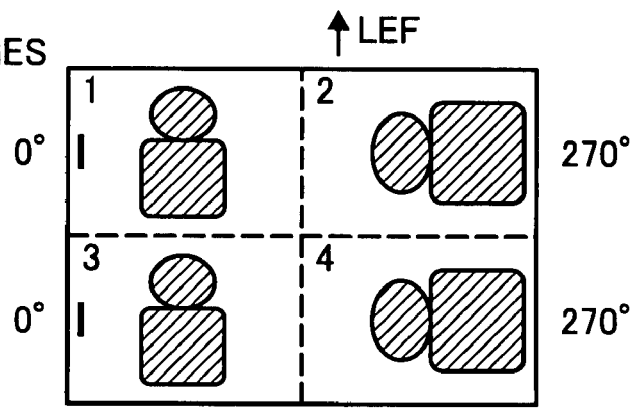
BINDING POSITION ON LEFT
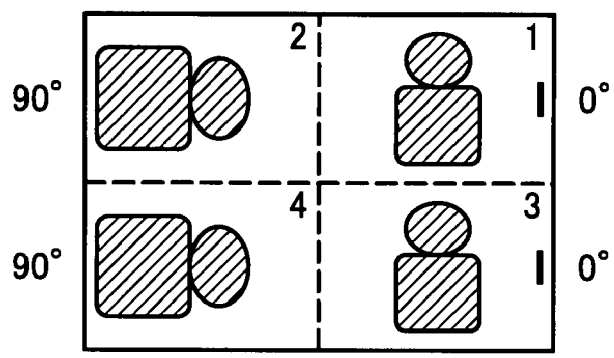
BINDING POSITION ON RIGHT

FIG. 17A
LOGICAL PAGES
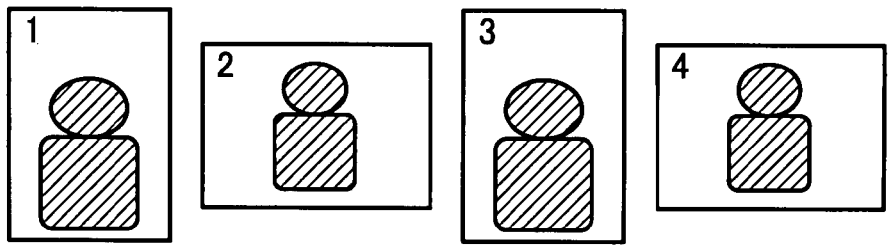
↓ FOUR-IN-ONE PRINTING
FIG. 17B
PHYSICAL PAGES
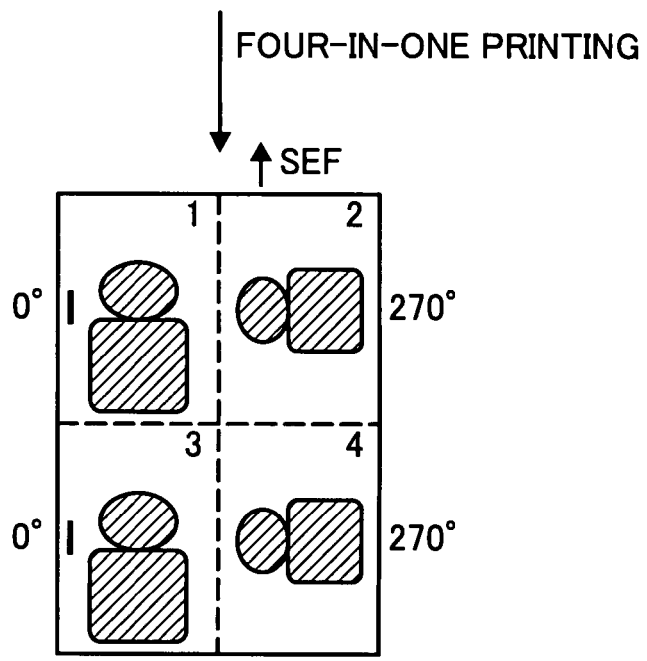
BINDING POSITION ON LEFT
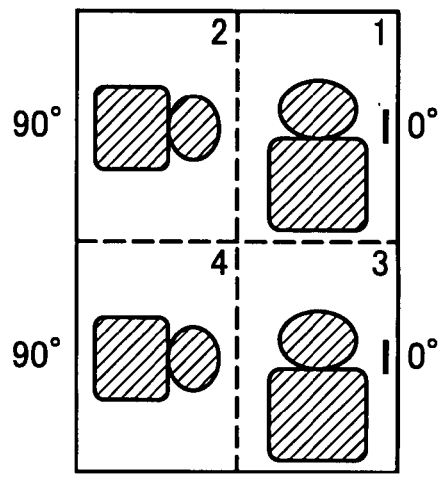
BINDING POSITION ON RIGHT

FIG. 18A
LOGICAL PAGES
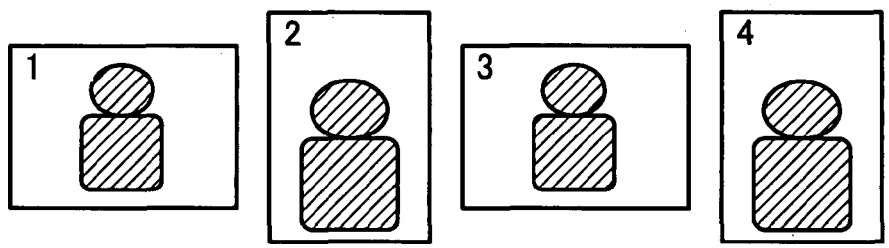
FOUR-IN-ONE PRINTING
FIG. 18B
PHYSICAL PAGES
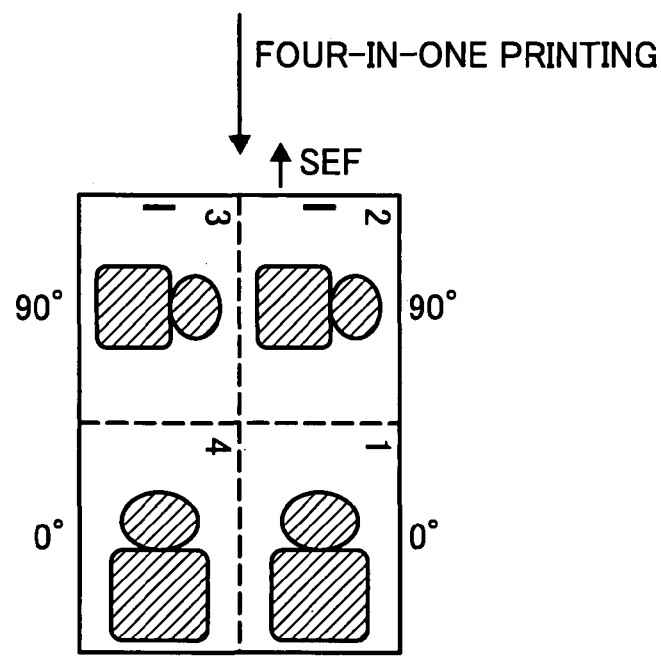
BINDING POSITION ON LEFT
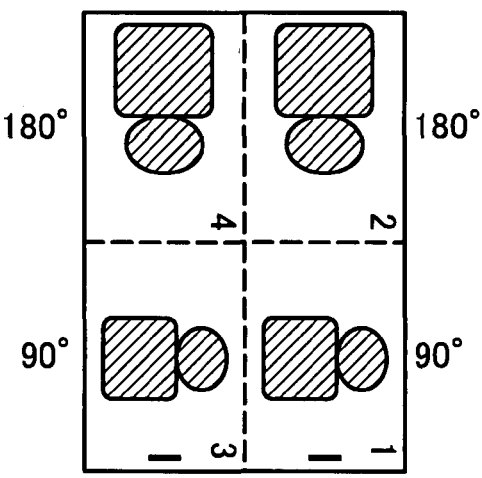
BINDING POSITION ON RIGHT

FIG. 19A
LOGICAL PAGES
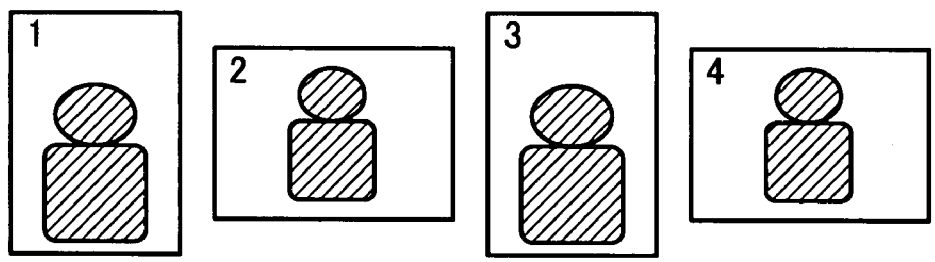
↓ TWO-IN-ONE PRINTING
FIG. 19B
PHYSICAL PAGES
BINDING POSITION ON LEFT
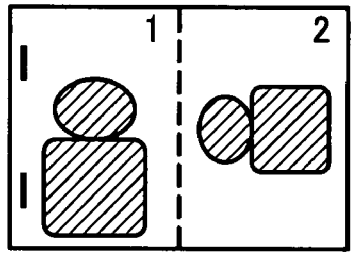 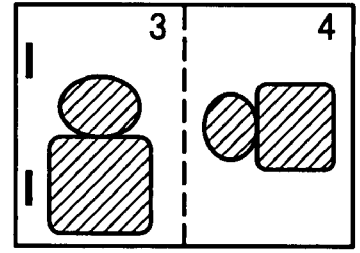
BINDING POSITION ON RIGHT
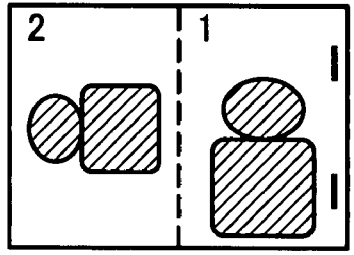 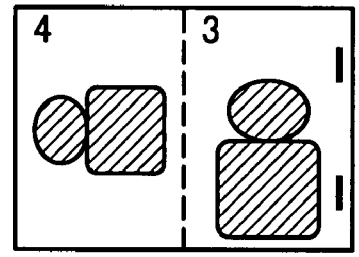

PRINT DATA PROCESSING APPARATUS, PRINTING APPARATUS, PRINTING SYSTEM, PRINT DATA PROCESSING METHOD, AND COMPUTER PROGRAM PRODUCT

CROSS-REFERENCE TO RELATED APPLICATIONS

The present document incorporates by reference the entire contents of Japanese priority document, 2005-352769 filed in Japan on Dec. 6, 2005.

BACKGROUND OF THE INVENTION

1. Field of the Invention

The present invention relates to a technology for combined printing of a plurality of pages.

2. Description of the Related Art

Print data processing apparatuses (also known as printer drivers) capable of combined printing of a plurality of print pages on a sheet of printing paper has been developed.

For example, Japanese Patent Application Laid-open No. 2003-89251 discloses a printing system for combined printing by dividing the size of printable paper into sections in the longer edge direction and laying out pieces of print data for multiple pages, which are reduced in size, into the divided sections, respectively.

Japanese Patent Application Laid-open No. 2003-233475 discloses a printer driver that, when the number of sheets of paper that are to be output is specified, automatically calculates how many pages should be printed on each sheet of paper and prints all pages on the specified number of sheets of paper.

As another example, Japanese Patent Application Laid-open No. 2005-78289 discloses a printing controlling apparatus that, taking a "Z folding" of sheets of paper into account, arranges a page with a title into an area having a standard size, whereas other multiple print target pages are collectively arranged into a specified area.

However, when print data for multiple pages including a page on which an image is oriented in a different direction from those on other pages (e.g., some images are in a portrait direction and other images are in a landscape direction) is to be collectively printed on a sheet of paper, the conventional print data processing apparatuses or printer drivers do not arrange and change the direction of the image to facilitate viewing.

According to the conventional techniques, when print data for multiple pages including a page on which an image is oriented in a different direction from others is to be collectively printed onto a sheet of paper, the image oriented in the different direction is rotated in a certain direction and reduced in size so that all the pages can be respectively printed into sections obtained by dividing the sheet of paper.

In the following explanation, the pages that are made up of a series of pieces of print data for multiple pages and have not been laid out yet will be referred to as "logical pages". On the other hand, the pages that are physically divided and obtained by laying out the print data for the logical pages to be printed onto paper will be referred to as "physical pages".

For example, let us discuss a situation where each physical page as shown in FIG. 19B is generated by collectively laying out print data for two logical pages onto one page (hereinafter "two-in-one printing"), the logical pages including both portrait pages (each of which shows the image in the proper upright direction when the rectangular sheet of paper is positioned so that the length thereof is placed in the up-and-down direction) and landscape pages (each of which shows the image in the proper upright direction when the rectangular sheet of paper is positioned so that the length thereof is placed in the left-and-right direction), as shown in FIG. 19A. According to the conventional techniques, each of the images in a set of logical pages oriented in a first direction (in the example, the logical pages in the landscape direction, namely, page 2 and page 4) is rotated into a second direction by 90 degrees to be laid out into a half portion of a physical page.

With this arrangement, however, a problem arises where the readability of the document can be very low, depending on the binding position of the pages. For example, in the example shown in FIGS. 19A and 19B, when the binding position is on the left (indicated with a pair of thin black bars in the drawing), the images on the portrait pages are in the proper upright direction in the way shown in the drawings, and the images on the landscape pages can also be viewed in the proper upright directions if the document is held so that the binding position comes to the top. Thus, the readability is not low. However, when the binding position is on the right, to view the images on the landscape pages (namely on page 2 and page 4) in the proper upright direction, the binding position has to be at the bottom. Thus, the readability of the document is low.

SUMMARY OF THE INVENTION

It is an object of the present invention to at least partially solve the problems in the conventional technology.

According to an aspect of the present invention, a print data processing apparatus that performs combined printing of a plurality of pages including a page on which an image is oriented in a direction different from that of images on other pages, includes a layout unit that lays out, in a memory, print data of target pages in a number specified to be combined into a single print, and a determining unit that determines a rotation angle by which an image on the target pages is to be rotated, while the layout unit is laying out the print data, based on specified number, a paper feeding direction for printing, a first direction in which an image on a first page of the target pages is oriented, an order in which the target pages are arranged, and a second direction in which an image on each of the target pages is oriented.

According to another aspect of the present invention, a print data processing method for combined printing of a plurality of pages including a page on which an image is oriented in a direction different from that of images on other pages, includes laying out, in a memory, print data of target pages in a number specified to be combined into a single print, and determining a rotation angle by which an image on the target pages is to be rotated, while the print data is being laid out, based on specified number, a paper feeding direction for printing, a direction in which an image on a first page of the target pages is oriented, an order in which the target pages are arranged, and a direction in which an image on each of the target pages is oriented.

According to still another aspect of the present invention, a computer program product comprising a computer usable medium having computer readable program codes embodied in the medium that when executed causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a detailed flowchart of a subroutine to determine the rotation angle θ shown in FIG. 6;

FIGS. 12A and 12B are schematics for explaining another example of the relationship between logical pages and physical pages;

FIGS. 13A and 13B are schematics for explaining yet another example of the relationship between logical pages and physical pages;

FIGS. 14A and 14B are schematics for explaining yet another example of the relationship between logical pages and physical pages;

FIGS. 15A and 15B are schematics for explaining an example of relationship between logical pages and physical pages in four-in-one printing;

FIGS. 16A and 16B are schematics for explaining for explaining another example of the relationship between logical pages and physical pages;

FIGS. 17A and 17A are schematics for explaining for explaining yet another example of the relationship between logical pages and physical pages;

FIGS. 18A and 18B are schematics for explaining for explaining yet another example of the relationship between logical pages and physical pages; and FIGS. 19A and 19B are schematics for explaining an example of relationship between logical pages and physical pages in two-in-one printing according to a conventional technique.

DETAILED DESCRIPTION OF THE PREFERRED EMBODIMENTS

Exemplary embodiments of the present invention will be explained in detail with reference to accompanying drawings.

Figure 1:
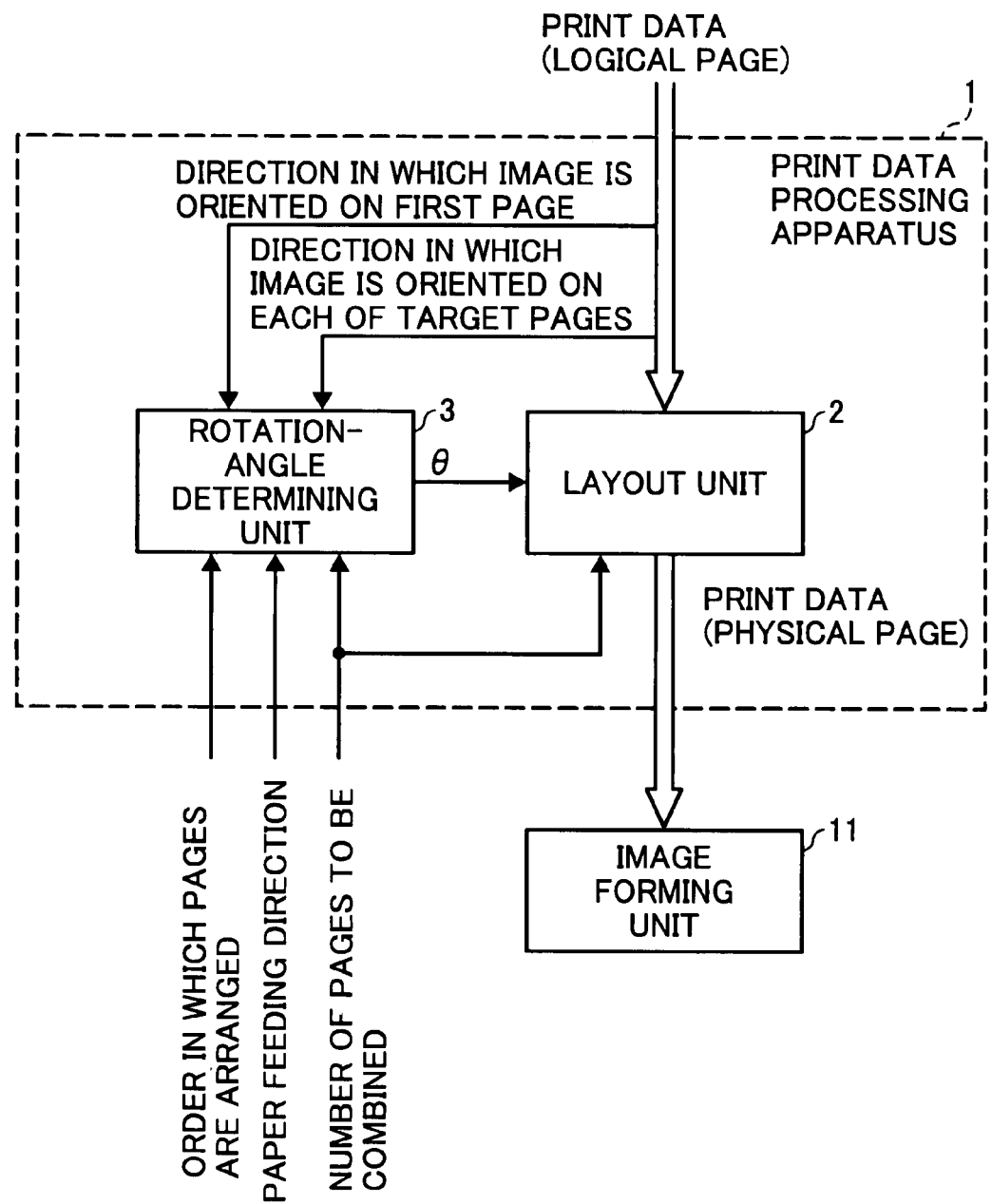
FIG. 1 is a functional block diagram of a print data processing apparatus according to an embodiment of the present invention.

FIG. 1 is a functional block diagram of a print data processing apparatus 1 according to an embodiment of the present invention. The print data processing apparatus 1 is used for printing, onto a sheet of paper, print data for multiple pages including a page on which an image is oriented in a different direction from images on other pages. The print data processing apparatus 1 includes a layout unit 2 and a rotation-angle determining unit 3.

The layout unit 2 lays out, in a memory, the print data of pages (i.e., logical pages) in a number specified to be combined into a single print (hereinafter, "target pages"), in such a state that the print data is to be collectively printed on a sheet of paper to create print data of a physical page. The layout unit 2 sends the created print data to an image forming unit 11 of the printing apparatus so that the print data is to be printed.

The rotation-angle determining unit 3 determines a rotation angle by which an image on each of the target pages is to be rotated and oriented in an optimal direction, while the layout unit is laying out the print data, based on the specified number (i.e., the number of pages to be collectively printed), the paper feeding direction for printing, the direction in which an image is oriented on the first page of the target pages, the order in which the target pages are arranged, and the direction in which the image is oriented on each of target pages.

Information that is needed by the rotation-angle determining unit 3 and is related to the direction in which the image is oriented on the first page and the direction in which the image is oriented on each of the target pages is included in a page start command for the logical page within the print data. Information related to the number of pages to be collectively printed, the paper feeding direction used during the printing process, and the order in which the pages are arranged can be obtained from the printing apparatus. However, it is also possible for a user to specify these items of the information. Even if it is not possible to obtain the information related to the paper feeding direction used during the printing process, it is possible to determine the rotation angle by hypothesizing a paper feeding direction, based on other information. The method will be explained in detail later.

Next, the paper feeding direction used during the printing process and the order in which the pages are arranged will be explained.

Figure 2A:
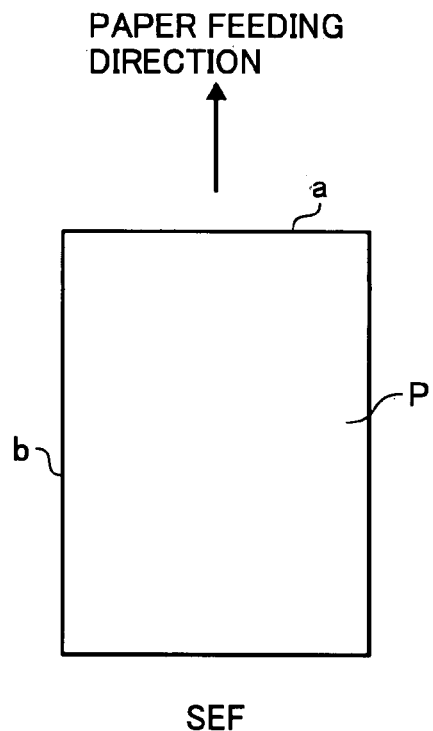
FIGS. 2A and 2B are schematics for explaining paper feeding directions according to the embodiment.
Figure 2B:
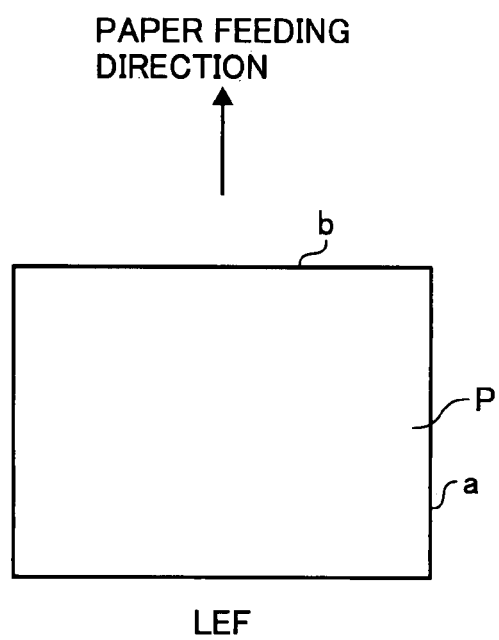

First, the paper feeding direction will be explained with reference to FIGS. 2A and 2B. When a rectangular-shaped sheet of paper P, such as A3, A4, B4, B5 size paper, is fed in such a manner that the shorter edge "a" is perpendicular to the direction in which the paper is fed (hereinafter, "short edge feed" (SEF)) as shown in FIG. 2A, whereas when paper P is fed in such a manner that the longer edge "b" is perpendicular to the direction in which the paper is fed (hereinafter, "long edge feed" (LEF)) as shown in FIG. 2B.

Figure 3A:
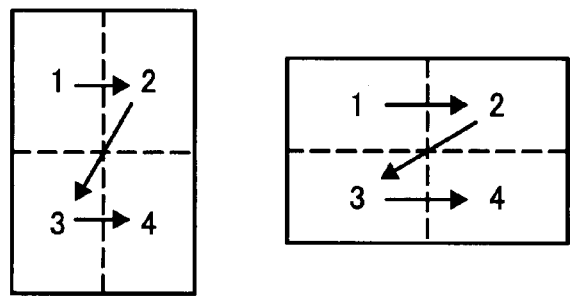
FIGS. 3A to 3C are schematics for explaining order in which pages are arranged according to the embodiment.
Figure 3B:
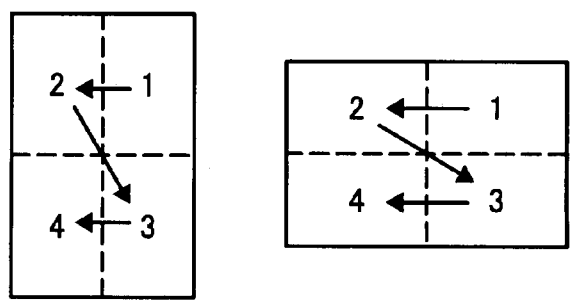
Figure 3C:
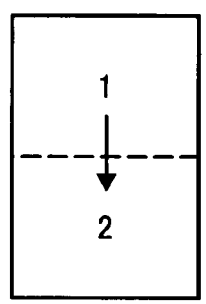

Next, the order in which the pages are arranged will be explained with reference to FIGS. 3A to 3C. In FIGS. 3A, 3B, and 3C, the numerals stand for the page numbers, whereas the arrows each indicate the order in which the pages are arranged.

For example, when an area of a sheet of paper is divided into four sections by dividing the length and the width of the paper into two so that images on four pages are arranged into the four sections respectively, if the binding position is on the left, generally speaking, as shown in FIG. 3A, the image on the first page is arranged, in its proper upright direction, into the top left quarter of the paper, and the images on the second, the third, and the fourth pages are sequentially arranged into the top right quarter, the bottom left quarter, and the bottom right quarter of the paper, respectively. This arrangement order will be referred to as "L to R".

If the binding position is on the right, generally speaking, as shown in FIG. 3B, the image on the first page is arranged, in its proper upright direction, into the top right quarter of the paper, and the images on the second, the third, and the fourth pages are sequentially arranged into the top left quarter, the bottom right quarter, and the bottom left quarter of the paper, respectively. This arrangement order will be referred to as "R to L".

In each of FIGS. 3A and 3B, shown on the left side is a situation where the first page is in the portrait direction, whereas shown on the right side is a situation where the first page is in the landscape direction.

When the number of pages to be collectively printed on a sheet of paper is expressed as n, the explanation above corresponds to the situation where n=4. However, the arrangement order is similar when $n=m^2$ is satisfied (m: an integer that satisfies $m \geq 2$), in other words, when n=9, n=16, n=25, or the like is satisfied.

When an area of a sheet of paper is divided into two sections by dividing only the length into two so that images on two pages are arranged into the two sections respectively, in other words, when n=2 is satisfied, as shown in FIG. 3C, the image on the first page is arranged into the top half, and then the image on the second page is arranged into the bottom half, sequentially. This arrangement order will be referred to as "T to B". The binding position is on the left, the right, the top, or the bottom, when the image on the first page is viewed in its proper upright direction.

When $n=2m^2$ is satisfied (m: an integer that satisfies $m \geq 2$), in other words, when n=8, n=18, n=32, or the like is satisfied, the rotation angle for the logical page is the same as the one used when n=2 is satisfied. However, the order in which the pages are arranged is the same as one of the L to R and R to L arrangement orders. When n=2 is satisfied, m=1 because $n=2m^2$ is satisfied.

The rotation-angle determining unit 3 then determines the rotation angle for each logical page, by using, as parameters, the number of pages to be collectively printed, the paper feeding direction explained above, the order in which the pages are arranged (L to R, R to L, or T to B arrangement order), the direction in which an image is oriented on the first page of pages to be collectively printed, and the direction in which an image is oriented on each of the target pages. Information on the direction of the images on the first page and the target pages is contained in the start command for the logical pages in the print data. Accordingly, the layout unit 2 rotates the image on each logical page by the determined rotation angle and loads the image into the memory to arrange it. When a printing job is to perform combined printing of print data for a document onto a plurality of sheets of paper, the layout unit 2 makes sure that the readability of the document does not become low even when the pages are bound together.

Figure 4:
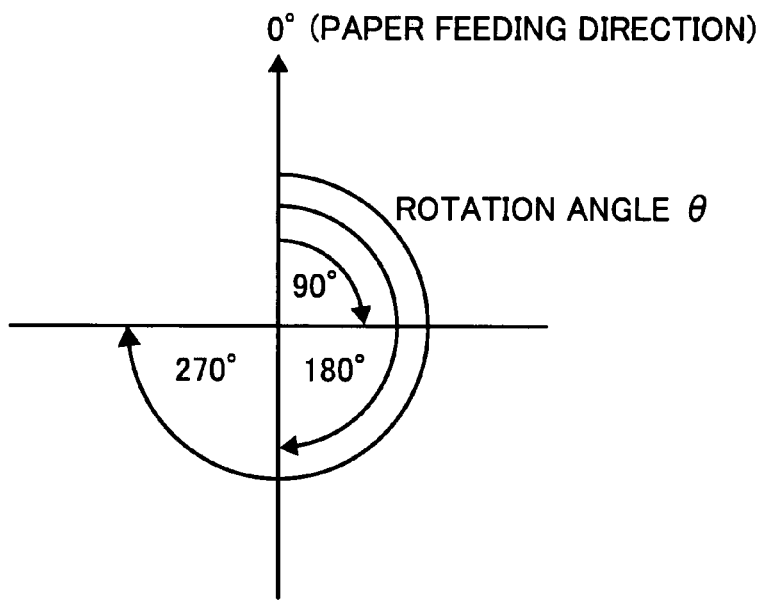
FIG. 4 is a schematic for explaining a rotation angle θ by which an image on a logical page is rotated to be arranged on a physical page according to the embodiment.

The rotation angle θ is one of four different angles, namely, 0 degrees, 90 degrees, 180 degrees, and 270 degrees in the clockwise direction, as shown in FIG. 4, when the paper feeding direction is defined as 0 degrees.

As a result, the relationship between the directions in which the images are oriented on the logical pages and on the physical pages in two-in-one printing is as shown in FIGS. 11A and 11B to FIGS. 14A and 14B. In the case of four-in-one printing, the relationship is as shown in FIGS. 15A and 15B to FIGS. 18A and 18B. In any one of these situations, to view the images on the pages printed on the sheets of paper while they are oriented in their proper upright directions, the binding position (indicated with a pair of thin black bars) never has to be at the bottom. Thus, the readability is high.

A specific example of how to determine the rotation angle to achieve the advantageous effect will be explained in the description of an embodiment of the printing apparatus below.

Figure 5:
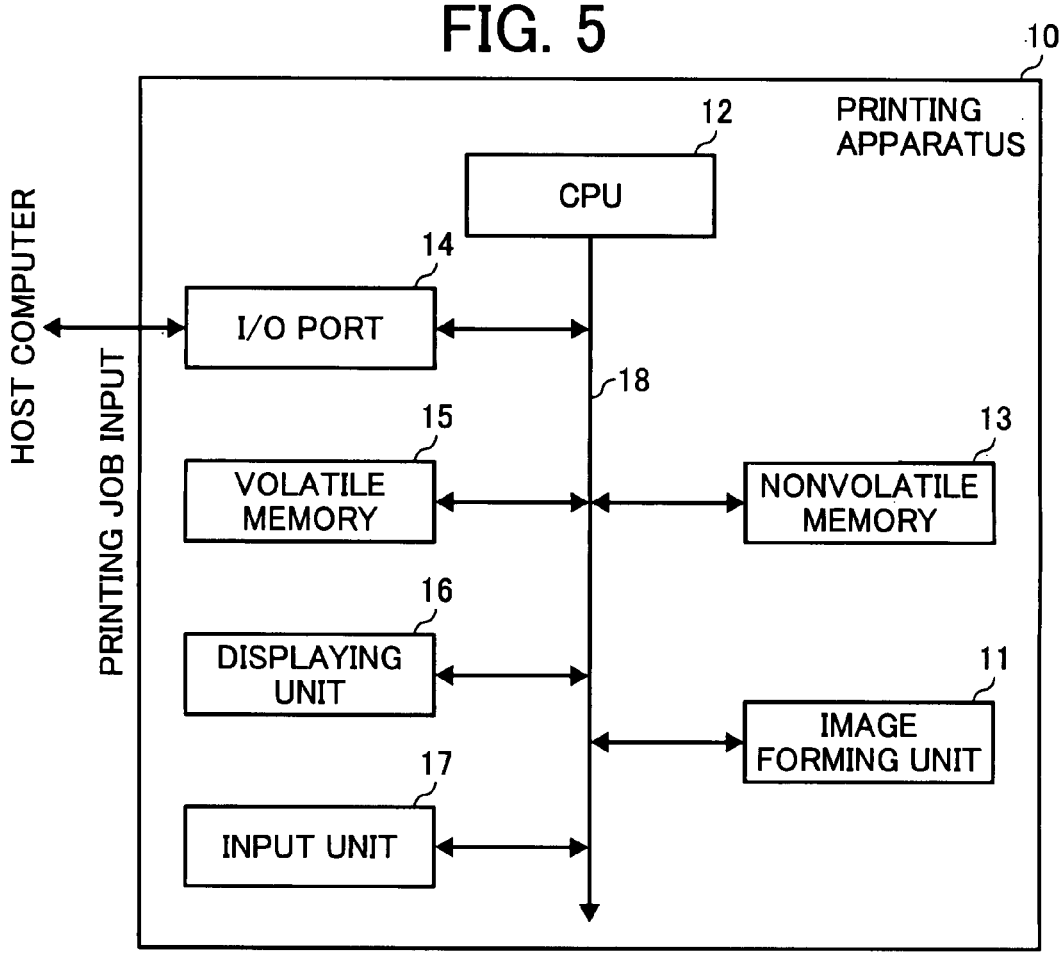
FIG. 5 is a block diagram of a hardware configuration of a printing apparatus according to an embodiment of the present invention.

FIG. 5 is a block diagram of a hardware configuration of a printing apparatus 10 according to an embodiment of the present invention.

The printing apparatus 10 includes the image forming unit 11, a Central Processing Unit (CPU) 12 that is a central processing device, a nonvolatile memory 13 such as a Read Only Memory (ROM), an Input/Output (I/O) port 14, a volatile memory 15 such as a Random Access Memory (RAM), a displaying unit 16 such as a Liquid Crystal Display (LCD), and an input unit 17, all of which are connected to one another with a bus 18.

The image forming unit 11 is a unit that receives print data for physical pages and actually forms images on sheets of paper. The image forming unit 11 may be an image forming device of any type; for example, an image forming unit using an electro photographic method, a thermal method, or an inkjet method. The printing apparatus 10 also has a paper feeding mechanism that stores therein printing paper in various sizes and selectively feeds paper in an appropriate size and a conveyer mechanism that conveys the fed paper.

The nonvolatile memory 13 stores therein a program that is software for having the CPU 12 execute the print data processing according to the present invention. A printing job (i.e., the print data for the logical pages) that has been generated by a host computer (not shown) or the like is forwarded to the printing apparatus 10, and the I/O port 14 receives the printing job as an input job. The print data in the input job is temporarily stored into the volatile memory 15. As an alternative operation, while a part of the volatile memory 15 is used as a buffer memory, the CPU 12 starts the print data processing in accordance with a program stored in the nonvolatile memory 13 and loads the images into the volatile memory 15 and arranges them in units of physical pages so that a plurality of logical pages in the input job are collectively printed. When the arrangement, i.e., the layout of the images to be collectively printed on one physical page, is completed, the print data for the physical page is sent to the image forming unit 11 so that the images are printed on a sheet of paper.

The displaying unit 16 displays errors that have occurred in the printing apparatus 10 and a screen for changing the settings. The input unit 17 includes keys and a touch panel that are used for inputting setting values or parameters to the printing apparatus 10.

Figure 6:
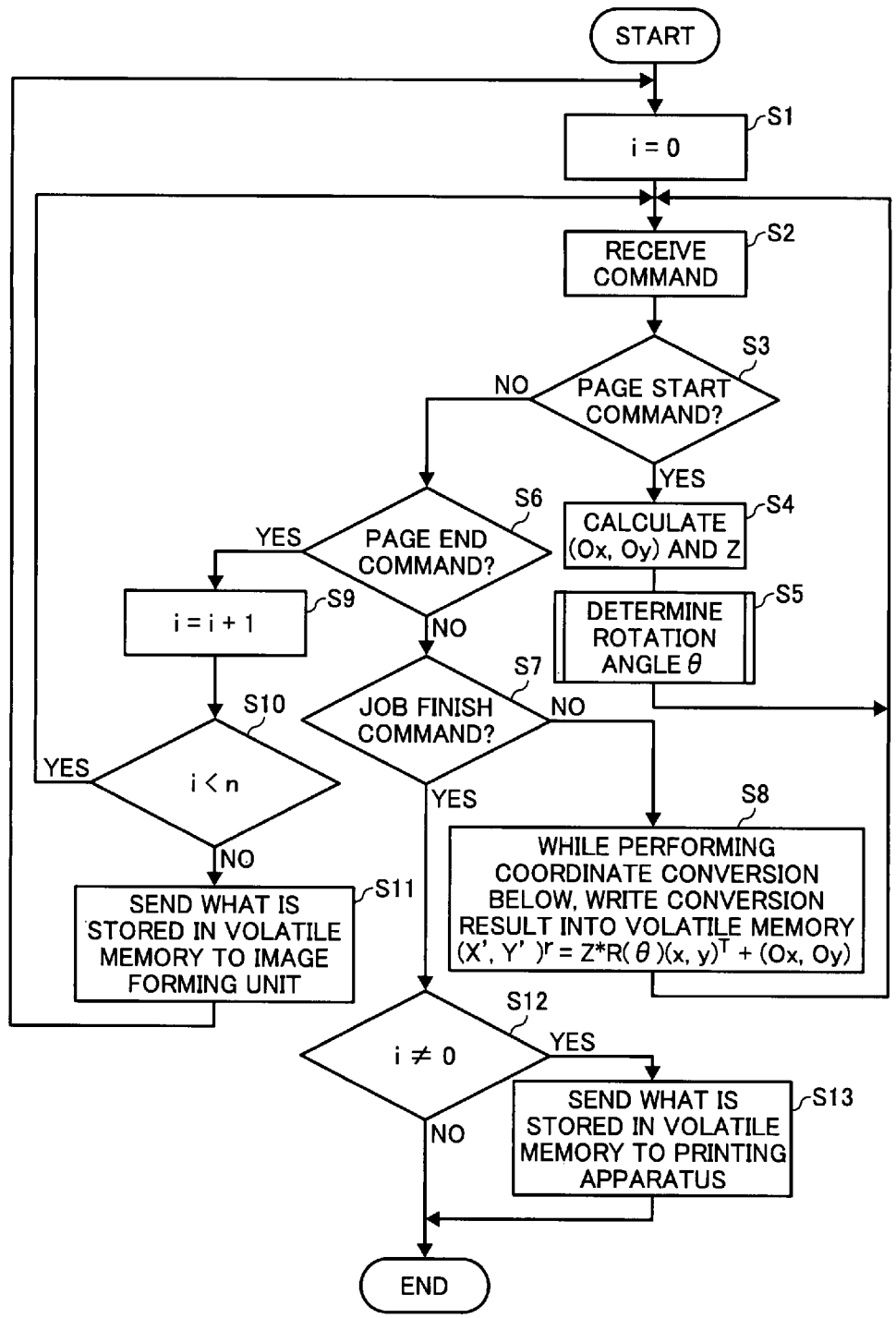
FIG. 6 is a flowchart of print data processing performed by a CPU shown in FIG. 5.

The CPU 12 performs print data processing during the combined printing of the printing apparatus 10 by selectively using one of the four tables, Table 1 to Table 4, stored in the nonvolatile memory 13 according to the flowcharts shown in FIGS. 6 and 7.

FIG. 6 is a flowchart of a main routine of the print data processing. FIG. 7 is a detailed flowchart of a subroutine to determine the rotation angle θ shown in FIG. 6.

When the processing is started, "i" is set to 0 at step S1. The value "i" is a value of a counter that counts the number of logical pages in the print data to be processed. Next, a command is received at step S2. At step S3, it is judged whether the received command is a page start command. When the received command is a page start command, the process proceeds to step S4 at which the origin (Ox, Oy) of the logical page on the physical page and the scaling ratio Z used for arranging the logical page onto the physical page are calculated. In a subroutine at step S5, the rotation angle θ by which the image is rotated when the logical page is arranged on the physical page is determined, and then the process returns to step S2. The process to determine the rotation angle θ will be explained in detail later.

When the command received at step S2 is not a start command, the process proceeds from steps S3 to S6 at which it is judged whether the received command is a page end command. Because a command issued after the page start command is not a page end command, the process proceeds to step S7 at which it is judged whether the job is finished. If the job is not finished, the process proceeds to step S8. At step S8, while a coordinate conversion is performed according to the expression shown below, the result of the conversion is written into the volatile memory 15, before the process returns to step S2.

$$(x',y')T = Z*R(\theta)(x,y)T + (Ox, Oy)$$

where (x, y)T represents a transposed matrix on the logical pages; (x', y')T represents a transposed matrix on the physical page; Z and (Ox, Oy) are the scaling ratio and the origin of the logical page on the physical page that have been calculated at step S4; and θ is the rotation angle determined at step S5.

Until it is judged at step S6 that the received command is a page end command, the process at the steps described above is repeated. When the process corresponding to one logical page is finished, it is judged at step S6 that the received command is a page end command. The process then proceeds to step S9 at which the count value of "i" is incremented by 1 (i+1). At step S10, if "i" has not reached "n" that represents the number of pages to be collectively printed, the process returns to step S2 at which a command for the next logical page is received. Only when a page start command has been received, (Ox, Oy) and Z are calculated at step S4, and the rotation angle θ is determined at step S5. Subsequently, until a page end command is received, logical pages are developed into the physical page stored in the volatile memory 15 at step S8. When a page end command has been received, the count value of i is incremented at step S10.

If the arrangement of logical pages into a physical page has been completed for all of the specified number of pages to be collectively printed, when the value of "i" is incremented at step S9, i=n is satisfied. Thus, the process proceeds from steps S10 to S11. At step S11, what is stored in the volatile memory, i.e., the print data for the physical page, is sent (forwarded) to the image forming unit 11, so that the combined printing is executed on one sheet of paper.

Subsequently, the process returns to step S1 at which "i" is reset to 0. The process of combined printing on the next page is started again. The process is repeated until the printing job is finished. Every time the layout for combined printing on one physical page is finished, the print data for the physical page is sent (forwarded) to the image forming unit 11 at step S11 so that the combined printing on one sheet of paper is executed.

When a series of processes in the printing job have been completed, a job finish command is received at step S2. Thus, it is judged at step S7 that the received command is a job finish command. At step S12 it is judged whether "i" is not 0. If "i" is not 0, the volatile memory 15 has stored therein data for the physical page. Thus, the data for the physical page is sent to the image forming unit 11 and printed at step S13. Subsequently, the process ends. If "i" is 0 at step S12, the process ends.

Next, the subroutine to determine the rotation angle θ at step S5 will be explained with reference to FIG. 7. The example described below is based on an assumption that it is possible to select "n", which represents the number of pages to be collectively printed, only out of 2 and $m^2$ (m: an integer that satisfies m≧2) such as 4, 9, 16, and the like.

Firstly at step S21, it is judged whether i=0 is satisfied. If i=0 is satisfied, it means that a page start command for the first page of the logical pages to be collectively printed has been received. Thus, in the process at steps S22 through S25, information is saved on the direction (portrait or landscape direction) in which the image is oriented on the first logical page that is necessary for determining the rotation angle, and also the paper feeding direction (LEF or SEF direction), the order in which the pages to be collectively printed are arranged (L to R, R to L, or T to B arrangement order), and the binding position are sequentially checked. These pieces of information are temporarily saved in the volatile memory 15.

Subsequently, at step S26, it is judged whether n, which represents the number of pages to be collectively printed, satisfies n=2. When n=2 is satisfied, the process proceeds to step S27. When n=2 is not satisfied, it means that n=$m^2$ is satisfied (m: an integer that satisfies m≧2), the process proceeds to step S29.

At step S27, the paper feeding direction is judged. When paper is to be fed in the LEF direction, Table 1 is selected at step S31. If paper is to be fed in the SEF direction, Table 2 is selected at step S32. If the paper feeding direction is unknown, it is judged at step S28 whether the direction in which the image is oriented on the logical page is portrait. If the image is in the portrait direction, the paper feeding direction is hypothesized as LEF so that Table 1 is selected at step S31. If the image is not in the portrait direction, i.e., the image is in the landscape direction, the paper feeding direction is hypothesized as SEF so that Table 2 is selected at step S32.

Also at step S29, the paper feeding direction is judged. When paper is to be fed in the LEF direction, Table 3 is selected at step S33. If paper is to be fed in the SEF direction, Table 4 is selected at step S34. If the paper feeding direction is unknown, it is judged at step S30 whether the direction in which the image is oriented on the logical page is landscape. If the image is in the landscape direction, the paper feeding direction is hypothesized as LEF so that Table 3 is selected at step S33. If the image is not in the landscape direction, i.e., the image is in the portrait direction, the paper feeding direction is hypothesized as SEF so that Table 4 is selected at step S34. The numerals shown in the tables are each a value of the rotation angle θ, and the unit is degrees (°). The portrait direction is indicated as "PORTRAIT", whereas the landscape direction is indicated as "LANDSCAPE".

After one of Table 1 through Table 4 has been selected in this manner, or when i=0 is not satisfied at step S21, which means that a page start command for the second page or a page thereafter has been received, only the direction in which the image is oriented on the logical page is checked at step S35, and the process proceeds to step S36. At step S36, the rotation angle θ is determined based on the information related to the order in which the pages to be collectively printed are arranged, the binding position, the direction in which the image is oriented on the logical page, according to the selected table, i.e., the table data. Subsequently, the process returns to the main routine shown in FIG. 6. Normally, when the pages are in the L to R arrangement order, the arrangement order corresponds to a binding position on the left, whereas when the pages are in the R to L arrangement order, the arrangement order corresponds to a binding position on the right. However, the binding position may be selected according to the user's preference. Thus, the binding positions do not have to be considered in some situations. In those situations, it says "Don't Care" in the tables.

TABLE 1

| Paper Feeding Direction | | LEF | | | |
|---|---|---|---|---|---|
| Direction on Page 1 | PORTRAIT | | LANDSCAPE | | |
| Page Arrangement Order | L to R | R to L | T to B | | |
| Binding Position | Don't Care | | Left | Right | Top or no binding |
| Direction of PORTRAIT | 0 | 0 | 0 | 180 | 180 |
| Logical Page LANDSCAPE | 270 | 90 | 90 | 90 | 90 |

TABLE 2

| Paper Feeding Direction | SEF | | | | |
|---|---|---|---|---|---|
| Direction on Page 1 | PORTRAIT | | LANDSCAPE | | |
| Page Arrangement Order | L to R | R to L | T to B | | |
| Binding Position | Don't Care | | Left | Right | Top or no binding |
| Direction of  PORTRAIT | 90 | 90 | 270 | 90 | 90 |
| Logical Page  LANDSCAPE | 0 | 180 | 0 | 0 | 0 |

TABLE 3

| Paper Feeding Direction | LEF | | | |
|---|---|---|---|---|
| Direction on Page 1 | PORTRAIT | | LANDSCAPE | |
| Page Arrangement Order | L to R | R to L | L to R | R to L |
| Binding Position | Don't Care | | | |
| Direction of  PORTRAIT | 90 | 90 | 270 | 90 |
| Logical Page  LANDSCAPE | 0 | 180 | 0 | 0 |

TABLE 4

| Paper Feeding Direction | SEF | | | |
|---|---|---|---|---|
| Direction on Page 1 | PORTRAIT | | LANDSCAPE | |
| Page Arrangement Order | L to R | R to L | L to R | R to L |
| Binding Position | Don't Care | | | |
| Direction of  PORTRAIT | 0 | 0 | 0 | 180 |
| Logical Page  LANDSCAPE | 270 | 90 | 90 | 90 |

Next, a specific example in which logical pages are arranged on physical pages in combined printing will be explained with reference to FIGS. 11A and 11B to FIGS. 18A and 18B.

Figure 11A:
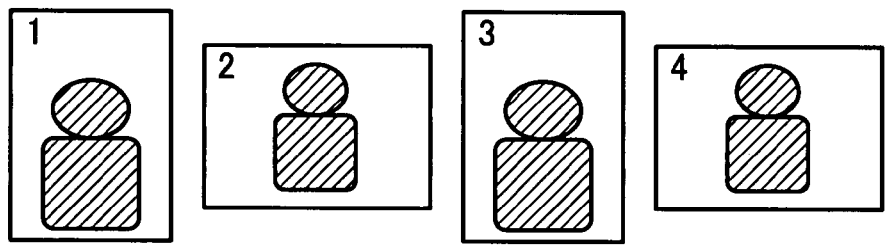
FIGS. 11A and 11B are schematics for explaining an example of relationship between logical pages and physical pages in two-in-one printing according to the embodiment.
Figure 11B:
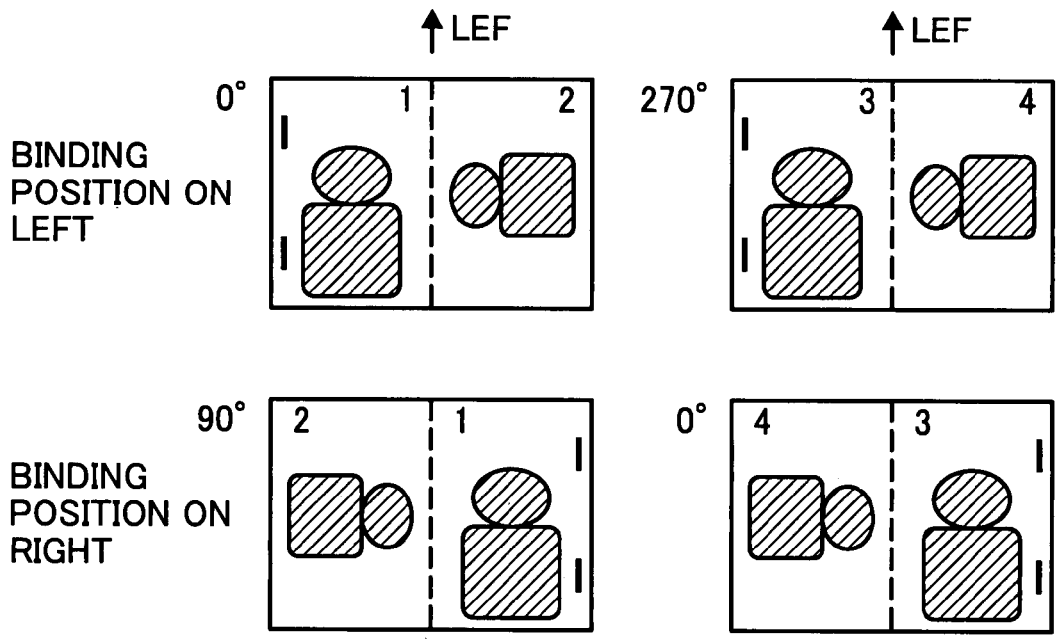

FIGS. 11A and 11B depict an example in which two-in-one printing is performed in a situation where paper is to be fed in the LEF direction and the first logical page is in the portrait direction.

In this situation, n=2 is satisfied, and the paper feeding direction is LEF. Thus, Table 1 is selected at step S31 in FIG. 7. Because the first logical page is in the portrait direction, the left half of Table 1 is used. If the page arrangement order is L to R, the first logical page is in the portrait direction. Thus, the rotation angle is determined as 0°. The second logical page is in the landscape direction. Thus, the rotation angle is determined as 270°. Because n=2 is satisfied, the third page is the same as the first page, and the fourth page is the same as the second page. Accordingly, the pages are arranged like the physical pages with the binding position on the left shown in FIG. 11B.

If the page arrangement order is R to L, the first logical page is in the portrait direction. Thus, the rotation angle is determined as 0°. The second logical page is in the landscape direction. Thus, the rotation angle is determined as 90°. Accordingly, the pages are arranged like the physical pages with the binding position on the right shown in FIG. 11B.

Consequently, the binding position is never at the bottom to view, in the proper upright direction, any of the images on the physical pages that have been obtained as a result of the combined printing.

FIGS. 12A and 12B depicts another example that is different from the example described above only in that the first logical page is in the landscape direction.

In this situation also, Table 1 is selected. Because the first logical page is in the landscape direction, the right half of Table 1 is used. The page arrangement order is T to B (to view the image on the first physical page in the proper upright direction). If the binding position is on the left, the first logical page is in the landscape direction. Thus, the rotation angle is determined as 90°. The second logical page is in the portrait direction. Thus, the rotation angle is determined as 0°.

If the binding position is on the right, the first logical page is in the landscape direction. Thus, the rotation angle is determined as 90°. The second logical page is in the portrait direction. Thus, the rotation angle is determined as 180°. Also, if the binding position is at the top or if no binding is performed, the first logical page is in the landscape direction. Thus, the rotation angle is determined as 90°. The second logical page is in the portrait direction. Thus, the rotation angle is determined as 180°.

Accordingly, the pages are arranged like the physical pages with the binding positions on the left, on the right, and at the top, respectively, shown in FIG. 12B. In these situations also, the binding position is never at the bottom to view, in the proper upright direction, any of the images on the physical pages that have been obtained as a result of the combined printing.

FIGS. 13A and 13B depict yet another example in which, again, n=2 is satisfied in a situation where paper is to be fed in the SEF direction and the first logical page is in the portrait direction. Table 2 is selected at step S32 shown in FIG. 7, and the left half of Table 2 is used.

If the page arrangement order is L to R, the first logical page is in the portrait direction. Thus, the rotation angle is determined as 90°. The second logical page is in the landscape direction. Thus, the rotation angle is determined as 0°. If the page arrangement order is R to L, the first logical page is in the portrait direction. Thus, the rotation angle is determined as 90°. The second logical page is in the landscape direction. Thus, the rotation angle is determined as 180°. Accordingly, the pages are arranged like the physical pages with the binding positions on the left and on the right, respectively, shown in FIG. 13B.

FIGS. 14A and 14B depict a similar example in which the first page is in the landscape direction. The right half of Table 2 is used. The page arrangement order is T to B. If the binding position is on the left, the first logical page is in the landscape direction. Thus, the rotation angle is determined as 0°. The second logical page is in the portrait direction. Thus, the rotation angle is determined as 270°. If the binding position is on the right, the first logical page is in the landscape direction. Thus, the rotation angle is determined as 0°. The second logical page is in the portrait direction. Thus, the rotation angle is determined as 90°. Also, if the binding position is at the top or if no binding is performed, the first logical page is in the landscape direction. Thus, the rotation angle is determined as 0°. The second logical page is in the portrait direction. Thus, the rotation angle is determined as 90°.

Accordingly, the pages are arranged like the physical pages with the binding positions on the left, on the right, and at the top, respectively, shown in FIG. 14B. In these situations also, the binding position is never at the bottom to view, in the proper upright direction, any of the images on the physical pages that have been obtained as a result of the combined printing.

FIGS. 15A and 15B to FIGS. 18A and 18B each depict an example in which n=4 is satisfied; paper is fed in the LEF direction in FIGS. 15A and 15B and FIGS. 16A and 16B, and paper is fed in the SEF direction in FIGS. 17A and 17B and FIGS. 18A and 18B.

In the situation shown in FIGS. 15A and 15B, Table 3 is selected and the left half of the table is used. If the page arrangement order is L to R, the first and the third logical pages are each in the portrait direction. Thus, the rotation angle is determined as 90°. The second and the fourth logical pages are each in the landscape direction. Thus, the rotation angle is determined as 0°. If the page arrangement order is R to L, the first and the third logical pages are each in the portrait direction. Thus, the rotation angle is determined as 90°. The second and the fourth logical pages are each in the landscape direction. Thus, the rotation angle is determined as 180°. Accordingly, the pages are arranged like the physical pages with the binding positions on the left and on the right, respectively, shown in FIG. 15B.

In the situation shown in FIGS. 16A and 16B also, Table 3 is selected and the right half of the table is used. If the page arrangement order is L to R, the first and the third logical pages are each in the landscape direction. Thus, the rotation angle is determined as 0°. The second and the fourth logical pages are each in the portrait direction. Thus, the rotation angle is determined as 270°. If the page arrangement order is R to L, the first and the third logical pages are each in the landscape direction. Thus, the rotation angle is determined as 0°. The second and the fourth logical pages are each in the portrait direction. Thus, the rotation angle is determined as 90°. Accordingly, the pages are arranged like the physical pages with the binding positions on the left and on the right, respectively, shown in FIG. 16B.

In the situation shown in FIGS. 17A and 17B, Table 4 is selected and the left half of the table is used. If the page arrangement order is L to R, the first and the third logical pages are each in the portrait direction. Thus, the rotation angle is determined as 0°. The second and the fourth logical pages are each in the landscape direction. Thus, the rotation angle is determined as 270°. If the page arrangement order is R to L, the first and the third logical pages are each in the portrait direction. Thus, the rotation angle is determined as 0°. The second and the fourth logical pages are each in the landscape direction. Thus, the rotation angle is determined as 90°. Accordingly, the pages are arranged like the physical pages with the binding positions on the left and on the right, respectively, shown in FIG. 17B.

In the situation shown in FIGS. 18A and 18B also, Table 4 is selected and the right half of the table is used. If the page arrangement order is L to R, the first and the third logical pages are each in the landscape direction. Thus, the rotation angle is determined as 90°. The second and the fourth logical pages are each in the portrait direction. Thus, the rotation angle is determined as 0°. If the page arrangement order is R to L, the first and the third logical pages are each in the landscape direction. Thus, the rotation angle is determined as 90°. The second and the fourth logical pages are each in the portrait direction. Thus, the rotation angle is determined as 180°. Accordingly, the pages are arranged like the physical pages with the binding positions on the left and on the right, respectively, shown in FIG. 18B.

In any of the situations described above, the binding position is never at the bottom to view, in the proper upright direction, any of the images on the physical pages that have been obtained as a result of the combined printing.

The examples in which n that represents the number of pages to be collectively printed is 2 and 4 have been explained. However, when $n=m^2$ is satisfied (m: an integer that satisfies $m \geq 2$), i.e., when n is 9, 16, 25, 36, and so on, it is possible to apply the same process as the one performed when n=4 is satisfied.

Also, when $n=2m^2$ is satisfied (m: an integer that satisfies $m \geq 2$), by replacing T to B shown in Table 1 and Table 2 with L to R and R to L and eliminating the situations in which the binding position is up and no binding is performed, it is possible to apply the same process as the one performed when n=2 is satisfied.

Figure 8:
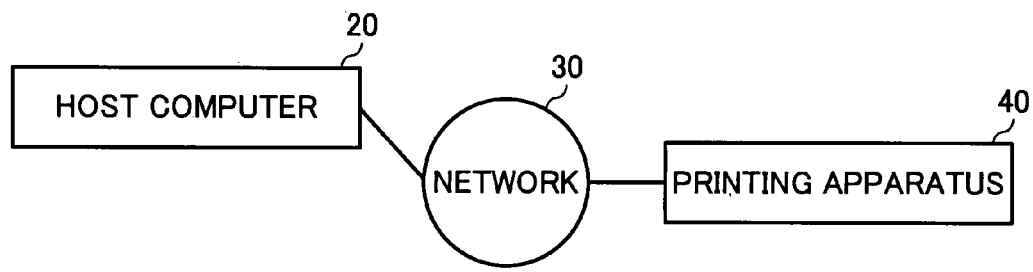
FIG. 8 is a block diagram of a printing system according to an embodiment of the present invention.

Next, a printing system according to an embodiment of the present invention will be explained with reference to FIGS. 8 through 10. FIG. 8 is a block diagram of the printing system.

In the printing system, a host computer 20 is connected to a printing apparatus 40 via a network 30.

Figure 9:
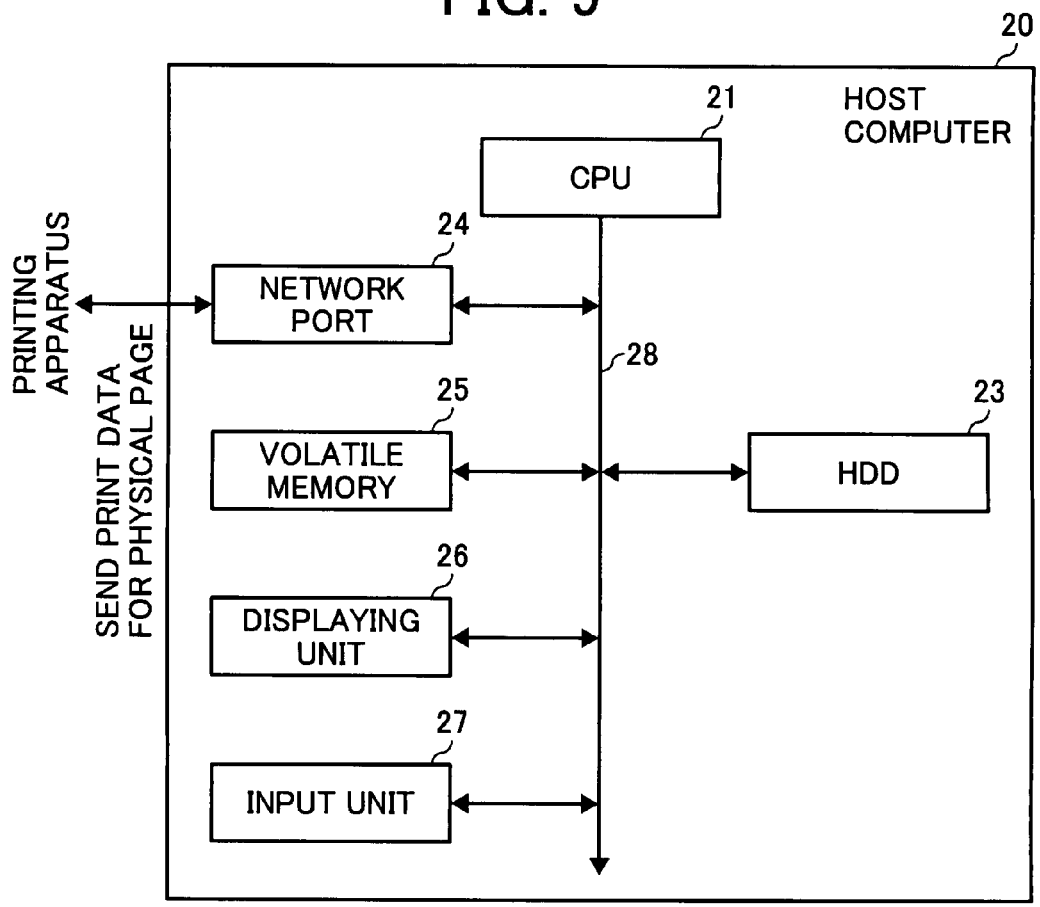
FIG. 9 is a block diagram of a hardware configuration of a host computer shown in FIG. 8.

FIG. 9 is a block diagram of a hardware configuration of the host computer 20. Unlike the printing apparatus 10, the host computer 20 includes no image forming unit that prints images on paper. The host computer 20 includes a CPU 21 that is a central processing device, a Hard Disk Drive (HDD) 23 that is a hard disk device, a network port 24 that is used for connecting the host computer 20 to the network 30, a volatile memory 25 such as a RAM, a displaying unit 26 such as an LCD, and an input unit 27 such as a keyboard, all of which are connected to one another with a bus 28.

A print data processing program that is software used for causing the CPU 21 to realize the print data processing function has been installed in the HDD, not in a nonvolatile memory. The HDD also stores therein other programs for realizing a document generating function, an image processing function, and the like that are generally used. Thus, the host computer 20 itself is able to generate print data for the logical pages. The host computer 20 is also able to receive document data or the like via the network 30 and generates print data from the received document data or the like.

Figure 10:
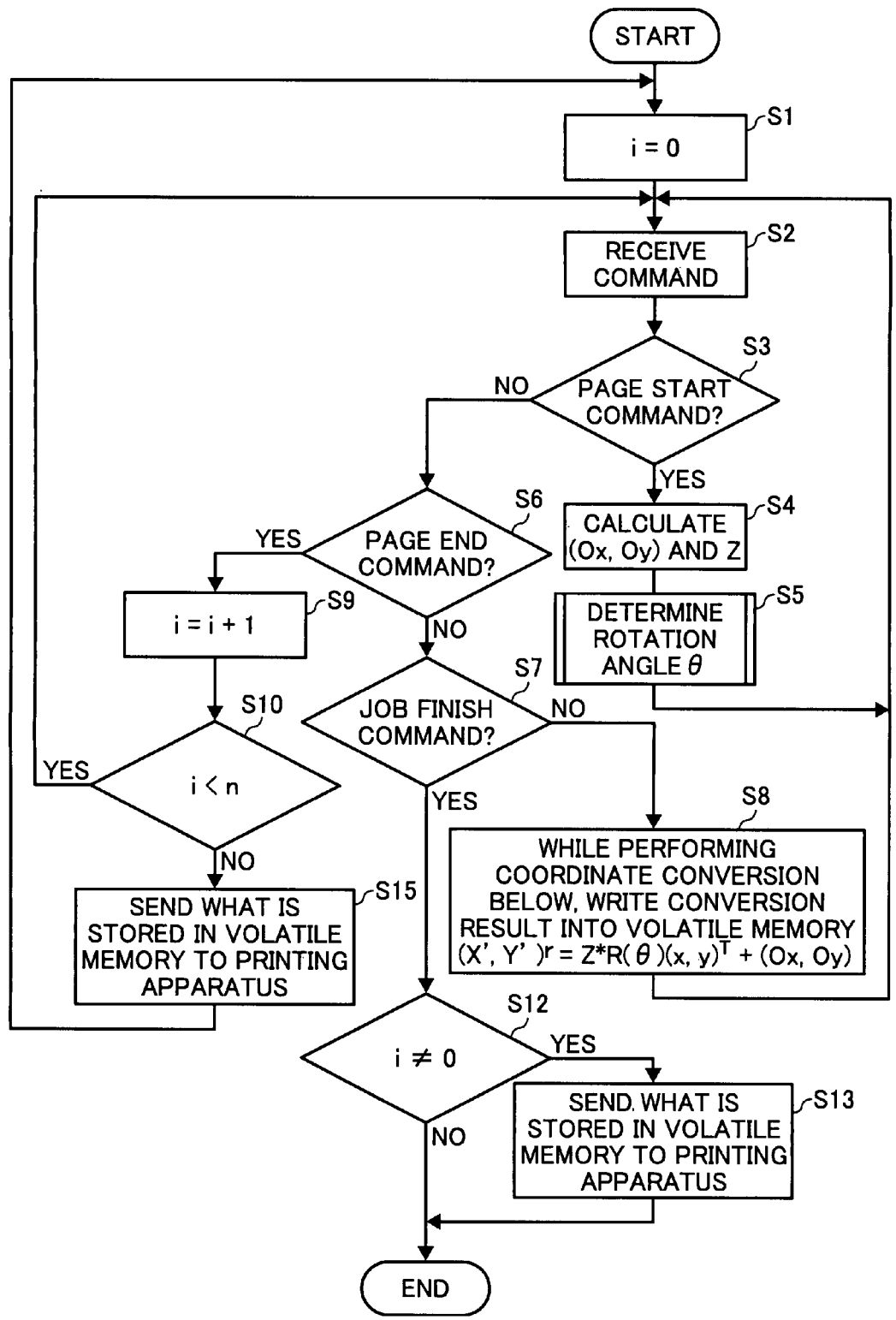
FIG. 10 is a flowchart of print data processing performed by a CPU shown in FIG. 9.

FIG. 10 is a flowchart of the print data processing performed by the CPU 21 of the host computer 20. The process performed at the steps in the flowchart in FIG. 10 is almost the same as that shown in FIG. 6 performed by the CPU 12 of the printing apparatus 10. The only difference is that "send what is stored in the volatile memory to the image forming unit" at step S11 is changed to "send what is stored in the volatile memory to the printing apparatus" at step S15. The explanation of the difference will be omitted. The process in the subroutine to "determine the rotation angle θ" at step S5 is also the same as the process in the flowchart shown in FIG. 7.

According to the embodiment, the logical pages in the print data are converted into physical pages by the host computer 20. Thus, unlike the embodiment described above, the printing apparatus 40 directly receives the physical pages and sends the received physical pages to an image forming unit so that they are printed through combined printing.

Consequently, an advantageous effect is achieved where it is possible to reduce the load of the printing apparatus and also to simplify the software for the printing apparatus.

Like with the printing apparatus described above, the information regarding the paper feeding direction is necessary for selecting one of Tables 1 to 4 and determining the rotation angle θ, depending on the parameters described above. To find out the paper feeding direction used by the printing apparatus 40, the host computer needs to perform bidirectional communication with the printing apparatus 40. However, depending on the network environment, it is sometimes not possible to perform bidirectional communication, or it is sometimes not be possible to obtain the necessary information due to a communication error. In these situations, to perform two-in-one printing, physical pages are generated with a rotation angle θ determined by hypothesizing that the paper feeding direction is LEF if the first logical page in the printing job is in the portrait direction, and the paper feeding direction is SEF if the first logical page is in the landscape direction.

To perform n-in-one printing (where $n=m^2$ is satisfied, and m is an integer that satisfies $m \geq 2$), physical pages are generated with a rotation angle θ determined by hypothesizing that the paper feeding direction is SEF if the first logical page in the printing job is in the portrait direction, and that the paper feeding direction is LEF if the first logical page is in the landscape direction. If the direction of the received physical page does not match the paper feeding direction, the printing apparatus 40 sends the physical page to the image forming unit after rotating it by 90 degrees.

With these arrangements, when the print data for the physical page generated by the host computer 20 is printed by the printing apparatus 40 via the network 30, even if the paper feeding direction used in the printing apparatus 40 is unknown, it is possible to adjust the directions of the logical pages and to obtain a printing result of which the readability is high.

A computer program according to an embodiment of the present invention causes the host computer 20 or a microcomputer that uses, as its central unit, the CPU 12 of the printing apparatus 10 to function as a layout unit and a rotation-angle determining unit, the layout unit being operable to lay out, in a memory, print data of a specified number of pages (i.e., pages to be collectively printed) in such a state that the print data is to be collectively printed on a sheet of paper, and the rotation-angle determining unit being operable to determine a rotation angle by which an image on each of the specified number of pages is to be rotated, while the layout unit is laying out the print data, based on the specified number, the paper feeding direction for printing, the direction in which an image is oriented on the first page of the specified number of pages, the order in which the pages are arranged, and the direction in which an image is oriented on each of target pages, the target pages each including an image for which the rotation angle should be determined.

More specifically, the computer program is for executing the process shown in the flowcharts of FIG. 6 or 10 and FIG. 7.

According to an embodiment of the present invention, there is also provided a computer-readable recording medium that has recorded thereon the program. Examples of the computer-readable recording medium include a flexible disc, a Compact Disc Read Only Memory (CD-ROM), a magneto optical disk, and a memory card.

It is possible to cause a computer or a printing apparatus to function as the host computer or the printing apparatus by installing the program for the print data processing on a memory of the computer or storing the program in a nonvolatile memory of the printing apparatus, via the recording medium or via the network.

According to an embodiment of the present invention, when print data of a specified number of pages is laid out in a memory to be combined into a single print, an image on each of the pages is rotated by a determined angle. The rotation angle is determined based on the specified number, paper feeding direction for printing, direction in which an image is oriented on the first page of the specified number of pages, order in which the specified number of pages are arranged, and direction in which an image is oriented on each of the target pages. Thus, even in the case of combined printing of a plurality of pages including a page on which an image is oriented in a different direction from others, better viewing of the pages is always achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print data processing apparatus that performs combined printing of a plurality of pages including a page on which an image is oriented in a direction different from that of images on other pages, the print data processing apparatus comprising:

a layout unit that lays out, in a memory, print data of target pages in a number specified to be combined into a single print; and a determining unit that determines a rotation angle by which an image on the target pages is to be rotated, while the layout unit is laying out the print data, based on specified number, a paper feeding direction for printing, a first direction in which an image on a first page of the target pages is oriented, an order in which the target pages are arranged, and a second direction in which an image on each of the target pages is oriented; and wherein the determining unit selects a table to determine the rotation angle based on the specified number and the paper feeding direction for printing; and wherein the determining unit selects the table, when the paper feeding direction is unknown, based on an assumption that paper is to be fed in a long-edge feed direction for the first direction being a portrait direction, and paper is to be fed in a short-edge feed direction for the first direction being a landscape direction, when the specified number is $2m^2$ where m is an integer that satisfies $m \geq 1$, and that paper is to be fed in the long-edge feed direction for the first direction being the landscape direction, and paper is to be fed in the short-edge feed direction for the first direction being the portrait direction, when the specified number is $m^2$ where m is an integer that satisfies $m \geq 2$.

2. A computer program product comprising a computer usable medium having computer readable program codes embodied in the medium that when executed causes a computer to execute:

laying out, in a memory, print data of target pages in a number specified to be combined into a single print; and determining a rotation angle by which an image on the target pages is to be rotated, while the print data is being laid out, based on specified number, a paper feeding direction for printing, a direction in which an image on a first page of the target pages is oriented, an order in which the target pages are arranged, and a direction in which an image on each of the target pages is oriented; and wherein executing the determining step includes selecting a table, when the paper feeding direction is unknown, based on an assumption that paper is to be fed in a long-edge feed direction for the first direction being a portrait direction, and paper is to be fed in a short-edge feed direction for the first direction being a landscape direction, when the specified number is $2m^2$ where m is an integer that satisfies $m \geq 1$, and that paper is to be fed in the long-edge feed direction for the first direction being the landscape direction, and paper is to be fed in the short-edge feed direction for the first direction being the portrait direction, when the specified number is $m^2$ where m is an integer that satisfies $m \geq 2$.

* * * * *